United States Patent [19]
Qiu

[11] Patent Number: 5,643,432
[45] Date of Patent: Jul. 1, 1997

[54] SELECTIVE ANODIZATION OF CAPACITOR ANODE BODY

[75] Inventor: Yong-Jian Qiu, Myrtle Beach, S.C.

[73] Assignee: AVX Corporation, Myrtle Beach, S.C.

[21] Appl. No.: 502,134

[22] Filed: Jul. 13, 1995

[51] Int. Cl.$^6$ .................... C25D 11/12; C25D 11/26; H01G 9/07
[52] U.S. Cl. .................. 205/50; 205/95; 205/122; 205/135; 205/136; 205/171; 205/175; 361/524; 361/529
[58] Field of Search .................... 205/95, 122, 135, 205/136, 171, 175; 361/523, 524, 528, 529

[56] References Cited

U.S. PATENT DOCUMENTS

| | | | |
|---|---|---|---|
| 3,450,606 | 6/1969 | Darrow | 205/121 |
| 4,450,049 | 5/1984 | Nakata et al. | 205/106 |
| 4,481,084 | 11/1984 | Chen et al. | 205/153 |
| 4,520,430 | 5/1985 | Long et al. | 361/529 |
| 4,582,574 | 4/1986 | Nguyen et al. | 205/153 |
| 4,589,056 | 5/1986 | Stimmell | 361/311 |
| 5,167,793 | 12/1992 | Jozefowicz | 205/121 |

*Primary Examiner*—Kathryn L. Gorgos
*Assistant Examiner*—William T. Leader
*Attorney, Agent, or Firm*—Paul J. Sutton

[57] ABSTRACT

A method for forming solid electrolytic capacitors provides for anode lead and body surface with increased dielectric thickness as distinguished from a dielectric thickness formed within the inner anode body such that a capacitance value associated therewith is not substantially decreased. The method includes the steps of anodizing the anode to form a predetermined dielectric thickness on the anode and then soaking the anode in a solvent to impregnate an inner portion thereof with the solvent. The solvent is removed from surface areas desired to be coated by a further dielectric layer and thereafter again anodized whereby additional dielectric build-up is limited to the solvent free areas. The solvent is driven off resulting in a capacitor preform which is reinforced by thickened dielectric without capacitance loss which would result from depositing additional dielectric interiorly in the areas insulated from build-up by the solvent.

9 Claims, No Drawings

SELECTIVE ANODIZATION OF CAPACITOR ANODE BODY

BACKGROUND OF THE INVENTION

The present invention relates to dielectric formation in the manufacture of solid state electrolytic capacitors, i.e. tantalum capacitors, and more particularly relates to selectively controlling the thickness of a dielectric formed on portions of an anodized electrode.

Solid state electrolytic capacitors are well known in the art and are typically fabricated by forming a pellet of powdered metal (e.g. tantalum) about an anode rod, sintering the pellet to form a porous mass bonded to the rod, forming a dielectric coating through the interior of the mass and exposed portions of the rod, e.g. by an anodizing step in a phosphoric acid bath, forming a conductive counterelectrode or cathode by overcoating the dielectric via manganizing or conductive polymer dipping, and terminating as by forming graphite and silver layers over the exterior surface of the counterelectrode.

The step of anodizing is a crucial step in the formation of a dielectric layer for use in solid state electrolytic capacitors, such as aluminum and tantalum. When, for example, an anodization is performed on a sintered anode in an electrolyte solution containing, for example, phosphoric acid, the thickness of the dielectric formed is in direct proportion to the time and applied voltage. The dielectric layer formed will be uniform throughout the anode as long as all portions of the anode are fully wetted by the electrolyte used in the process. In other words, the above-described conventional anodization process is non-selective, i.e., provides no mechanism for varying a depth of the dielectric on various portions of and within the anode body.

The inner body of the anode is responsible for contributing most of the finished capacitor's capacitance value. Consequently, the thickness of dielectric interposed between the anode and counter electrode directly defines the resulting capacitance. As a thickness of dielectric increases, the capacitance decreases but with consequent increase in working voltage of the capacitor. An increased dielectric thickness on the anode lead and the external anode surface (as distinguished from the inner portion) of the anode body provides increased protection against stress-related and other mechanical damages generated in post-anodization processes, such as in a step of manganizing the dielectric-coated anode. A dilemma therefore exists utilizing conventional anodization methods, which are non-selective, whether anode lead and body surface will receive a thicker dielectric layer and, hence, greater mechanical and electrical integrity at the expense of decreased capacitance. It would thus be desirable to provide a means for forming an increased dielectric thickness on external portions of the capacitor without increasing the thickness of the interior capacitance forming dielectric.

OBJECTS AND SUMMARY OF THE INVENTION

It is therefore an object of the present invention to provide a process for manufacturing a solid state electrolytic capacitor which overcomes the above-described shortcomings of the prior art.

It is another object of the present invention to provide a process for manufacturing a solid state electrolytic capacitor by which a thicker dielectric layer may be provided on portions of the anode's lead and external body surface without substantially decreasing the capacitor's capacitance value.

It is yet another object of the present invention to provide a process for manufacturing a solid electrolytic capacitor where a dielectric thickness on different anode portions is selectively controlled.

It is still yet another object of this invention to provide a solid electrolytic capacitor which is formed utilizing a selective anodizing process such that a dielectric thickness on anode lead and anode body surface is selectively increased without substantially further impregnating the anode body with the dielectric.

A method for manufacturing a solid electrolyte capacitor is provided which enables the selective control of a dielectric thickness at various portions of an anode during an anodization process. In a preferred form of the given method, the anode is anodized twice, once in a non-selective process to render the desired dielectric thickness within and over the porous anode body and then selectively anodized a second time such that only the thickness of dielectric covering the lead and body surface are substantially increased.

In a preferred form, the method includes a step of anodizing an anode using a conventional method to form a capacitance defining dielectric coating thereon at desired thickness. A step is then implemented where the anodized anode is soaked with a solvent to prevent the bulk or body of the anode from direct contact with an electrolyte utilized in a subsequent anodization step. Solvent is removed from portions, i.e. external surfaces and the solvent-treated anodized anode is then anodized in an aqueous-based electrolytic solution, whereby selective anodization occurs only at the lead and anode surface, i.e. the surfaces free from solvent. In a final step the solvent is evaporated, rendering an anode with a greater amount of dielectric material layered on its anode lead and surface, than the amount layered within the anode body.

The solvent utilized within the process is preferably an organic solvent that is water-immiscible. In addition, the organic, water-immiscible solvent preferably displays a reasonably high boiling point and has a low viscosity to facilitate penetration. In addition, it is preferred that the solvent is easily impregnated into the dielectric coated anode body and easy to remove. One group of solvents fitting the above limitations includes benzene, dichlorobenzene, trichlorobenzene, trimethylpentane, heptane, propylene carbonate, toluene, xylene, etc.; where toluene and xylene are preferable.

Capacitors formed according to the improved process of this invention show strong capacitance values as well as better imperviousness to stress and mechanical damage at the lead and anode surface particularly during the subsequent steps of manufacturing, i.e. counter-electrode formation via $MnO2$ formation and dipping.

DETAILED DESCRIPTION OF THE PREFERRED EMBODIMENTS

The present invention relates to a method of selectively anodizing a capacitive anode body for the manufacture of solid state electrolytic capacitors, for example, capacitors formed of powdered and subsequently sintered metals, i.e. tantalum, niobium and aluminum. An ideal result of the process of this invention is a capacitor or capacitor preform, the anode lead and body surface of which is strengthened by a dielectric layer, which is thicker than the thickness of the capacitance forming dielectric provided within the anode body without capacative value loss as a result of additional dielectric thickness within the anode body.

The preferred process begins with a step of non-selectively anodizing an anode to form a dielectric layer on the lead, in the body or bulk of the anode, as well as the anode's surface. The thickness of the dielectric is uniformly controlled to the specified thickness by the conventional anodizing process. A second step requires that the dielectric-coated and impregnated anode be soaked in a solvent to prevent the internal capacitance forming dielectric components from direct contact with an aqueous electrolyte in a subsequent anodization process. Concomitantly, due to the removal of surface solvent coatings the anode lead and surface will not be prevented from direct contact with the electrolyte.

Preferably, the solvent is an organic solvent. One method of implementing the soaking step is by dipping the anode in a solvent bath. The conventionally coated anode should be dipped in a solvent for around 10 seconds. In addition, it is preferable that the solvent be water immiscible and have a boiling point which is higher than 100° C., and be easily removable from the anode. Of the many solvents which fit the defined solvent category, several are: benzene, dichlorobenzene, trichlorobenzene, trimelhylpentane, heptane, propylene carbonate, toluene, xylene, etc.

The next step in the preferred process includes preferential removal of solvent from surface areas intended to be coated more thickly with dielectric and subjecting the solvent-soaked dielectric coated anode to a second selective anodization process within the preferably aqueous-based electrolyte solution. The portions of the anode impregnated with solvent, i.e., the anode's interior, will be impervious to application of the second dielectric coating due to the barrier formed by the solvent. A thicker dielectric is thereby formed only on the lead and anode surface areas from which solvent is removed. The added thickness is derived in proportion to a higher applied formation voltage. The result is an anode with a lead and anode surface that is thicker than the non-selectively formed dielectric in the anode body or bulk, minimizing possible capacitance loss while increasing ruggedness. A final step includes heating the anode to a temperature above the boiling point of the organic solvent. Accordingly, the impregnated organic solvent is removed by evaporation.

The following examples evidence a beneficial increased anode lead and anode body surface thickness without detrimental capacitance value decrease.

EXAMPLE I

A batch of sintered tantalum anodes were anodized by submersion in a 0.1% phosphoric acid bath at 85° C. and a formation voltage of about 85 Volts for one hour. A counter electrode was conventionally applied to examples of the batch and the capacitance measured at an average of about 10 microfarads. Other examples of the batch (without counter electrode) were soaked in toluene for approximately ten seconds. Thereafter, the saturated items from the batch were again anodized following solvent removal from the surface (i.e., selectively anodized) under the above-described conditions, but at a formation voltage of about 110 volts for thirty seconds. Due to the presence of the solvent, substantially no dielectric was added within the anode body. The anodes were thereafter heated to 150° C. for 10 minutes to release impregnated solvent from the bulk of the anode, i.e. the anode body.

Physical observations of the finished anode body surface and lead found that the second, selective anodization resulted in a change in color from green to gold. The color change evidenced a thickening of the dielectric layer thereon of about 450 angstroms. No substantial amount of dielectric material was found to have been added to the interior of the body. Capacitance measurement of the counterelectroded, twice anodized, capacitor revealed no noticeable capacitance loss despite the high voltage applied during the second anodization.

Manipulation of the twice anodized devices demonstrated that they were significantly more rugged and less susceptible to damage then the batch members subjected to a single anodizing procedure.

EXAMPLE II

A batch of sintered tantalum anodes were anodized by submersion in a bath of 0.1% phosphoric acid based electrolyte at 85° C. and subjected to a formation voltage of 55 Volts for an hour. Examples of the batch were counterelectroded and the capacitance obtained by this non-selective anodization averaged around 10 microfarads per finished capacitor. Other examples from the batch were then soaked in a xylene bath for around 10 seconds in order to fully impregnate the examples with the solvent. The saturated examples were then subjected to an 85 volt formation voltage for 20 seconds at 85° C. and thus selectively anodized. The selectively anodized anodes were heated to 150° C. for ten minutes to evaporate impregnated solvent. Analysis of the twice anodized examples indicated that the dielectric on the exposed lead and anode surfaces was significantly thicker than on the single anodized items from the batch and the twice anodized examples were clearly mechanically superior to the once anodized examples. No significant capacitance change was measured between capacitors formed from the once and twice anodized examples.

The process disclosed herein is of particular benefit in respect of capacitors formed of pressed and sintered porous anodes where a thick, robust, dielectric external coating following initial dielectric formation improves the ruggedness of the preform and resultant capacitor. Though there are theoretically no limits on the applied range of formation voltages during the anodization process, the process has been observed to be thoroughly effective on parts anodized at a voltage range of 10–150 Volts for the first anodizing. The preferred formation voltage range used in the selective anodization step disclosed herein is generally 10 to 30 volts higher than the voltage used in the first anodizing step.

Although the invention has been described herein with reference to a preferred embodiment, the description was for explanation purposes only and is not meant to limit the scope and spirit of the invention as defined by the following claims.

I claim:

1. A method for forming dielectric coatings of disparate thickness on the porous anode body of a solid state capacitor comprising the steps of:

anodizing said anode body to form a first dielectric coating having a generally uniform thickness through said anode body;

impregnating said anode body having said first coating with a liquid material forming a barrier to anodization;

causing increments of said liquid material to be removed from selected areas of said first coating, thereafter subjecting said impregnated anode body to a second anodizing step thereby to form a second dielectric coating on said selected areas while the portions of said first coating in contact with said liquid material are maintained free from said second coating and thereafter driving off the remainder of said liquid.

2. The method in accordance with claim 1 wherein said liquid comprises an organic solvent immiscible with water and said second anodizing step is carried out in a bath comprising water.

3. The method of claim 2 wherein said solvent is selected from the group consisting of benzene, dichlorobenzene, trichlorobenzene, trimethylpentane, heptane, propylene carbonate, toulene and xylene.

4. The method of claim 2 wherein said impregnating step is effected by dipping said anode body in said solvent.

5. The method of claim 2 wherein said step of removing said solvent is effected by causing partial evaporation of said solvent.

6. The method in accordance with claim 2 wherein said selected areas are primarily surface areas.

7. A capacitor formed in accordance with the method of claim 1.

8. The method of making a solid state capacitor preform which comprises the steps of providing a sintered porous mass of a solid state capacitor forming metal, subjecting said mass to a first anodizing step to form a first dielectric structure of generally uniform thickness through said mass; thereafter impregnating said mass with an organic solvent; thereafter causing increments of said solvent to be removed from selected portions of said mass; thereafter subjecting said mass to a second anodizing step to form additional dielectric material over said selected portions only, and thereafter causing the remaining solvent to be removed.

9. A capacitor form in accordance with the method of claim 8.

* * * * *